(12) United States Patent
Xiang

(10) Patent No.: US 11,318,917 B2
(45) Date of Patent: May 3, 2022

(54) MANUAL TRAILER LIFTING JACK WITH DRILL POWER OPTION

(71) Applicant: FORCOME (ZHEJIANG) CO., LTD., Jinhua (CN)

(72) Inventor: Chenpan Xiang, Jinhua (CN)

(73) Assignee: FORCOME (ZHEJIANG) CO., LTD., Zhejiang (CN)

( * ) Notice: Subject to any disclaimer, the term of this patent is extended or adjusted under 35 U.S.C. 154(b) by 163 days.

(21) Appl. No.: 16/941,320

(22) Filed: Jul. 28, 2020

(65) Prior Publication Data

US 2021/0387599 A1    Dec. 16, 2021

(30) Foreign Application Priority Data

Jun. 16, 2020  (CN) .......................... 202010545477.3

(51) Int. Cl.
  *B60S 9/00* (2006.01)
  *B60S 9/04* (2006.01)
(52) U.S. Cl.
  CPC ...................................... *B60S 9/04* (2013.01)
(58) Field of Classification Search
  CPC ...... B60S 9/00; B60S 9/02; B60S 9/04; B60S 9/14; B60S 9/20
  See application file for complete search history.

(56) References Cited

U.S. PATENT DOCUMENTS

| 4,796,864 | A | * | 1/1989 | Wilson | ...................... | B60S 9/08 |
| | | | | | | 254/425 |
| 5,906,356 | A | * | 5/1999 | Stratman | ................... | B66F 3/08 |
| | | | | | | 254/103 |
| 6,997,443 | B2 | * | 2/2006 | Jean | .......................... | B60S 9/06 |
| | | | | | | 254/424 |
| 2013/0092890 | A1 | * | 4/2013 | Alanko | ..................... | B60S 9/08 |
| | | | | | | 254/420 |
| 2021/0387599 | A1 | * | 12/2021 | Xiang | ....................... | B60S 9/04 |

* cited by examiner

*Primary Examiner* — Lee D Wilson
(74) *Attorney, Agent, or Firm* — SZDC Law P.C.

(57) ABSTRACT

A manual trailer lifting jack with drill power option includes: an outer tube; an inner tube that is telescopically slidable within the outer tube; a foot that is connected to a bottom of the outer tube; a top block that is connected to a top of the outer tube; a threaded rod that pass through a center of the top block and is rotatably held within the outer tube and fixed from axial movement relative to the outer tube; a threaded block that is connected to a top of the inner tube and has threads that engage the threaded rod so that a rotation of the threaded rod causes the inner tube to slide axially within the outer tube; a driving gear that is connect the top block and drives the threaded rod; a gear shaft that includes a bevel gear and a hexagonal head; and a gear housing that houses the gear shaft, driving gear, and the top block.

8 Claims, 4 Drawing Sheets

MANUAL TRAILER LIFTING JACK WITH DRILL POWER OPTION

The present invention claims priority to Chinese application no. 202010545477.3, filed on Jun. 16, 2020, which is which is incorporated by reference for all purposes as if fully set forth herein.

FIELD OF THE INVENTION

The present invention relates to a jack, specifically, a manual trailer lifting jack with drill power option.

BACKGROUND OF THE INVENTION

When an RV is parked, it is generally necessary to use a RV jack to lift the RV. The role of the jack is to support the RV. The RV is maintained horizontally by a tire assembly installed at the rear of the RV and the jack at the front of the RV. There are two types of RV jacks: electric jack and manual jack. The electric RV jack is convenient to use, but it is expensive. When there is no power available or the motor of the electric RV jack is damage, one will not be able to use the electric RV jack.

The manual jack is stable and inexpensive compared to the electric jack. However, it is more laborious to use than the electric jack.

There is a need for an RV jack can be operated manually or by a commonly available power source, e.g., a handheld power drill.

SUMMARY OF THE INVENTION

In one embodiment, a manual trailer lifting jack with drill power option includes: an outer tube; an inner tube that is telescopically slidable within the outer tube; a foot that is connected to a bottom of the outer tube; a top block that is connected to a top of the outer tube; a threaded rod that pass through a center of the top block and is rotatably held within the outer tube and fixed from axial movement relative to the outer tube; a threaded block that is connected to a top of the inner tube and has threads that engage the threaded rod so that a rotation of the threaded rod causes the inner tube to slide axially within the outer tube; a driving gear that is connect the top block and drives the threaded rod; a gear shaft that includes a bevel gear and a hexagonal head; and a gear housing that houses the gear shaft, driving gear, and the top block. The hexagonal head is rotated by a power drill to cause the rotation of the threaded rod.

In another embodiment, the manual trailer lifting jack with drill power option further includes: an adapter that includes a bushing and a rectangular block; a hand crank that includes a crank and handle; and a bolt. The bushing surrounds the gear shaft and is located between the bevel gear and the hexagonal head. A cross section of the crank has a U shape, and the crank includes two side walls and a connection wall. The bolt passes through the two side walls and the rectangular block to rotatably connect the hand crank to the adapter. The side walls engage the hexagonal head so that a rotation of the hand crank causes the rotation of the threaded rod.

In another embodiment, a gear ratio between the bevel gear and the driving gear is 1:2.5.

In another embodiment, the adaptor is made of iron or reinforced nylon.

In another embodiment, the crank is made of iron or reinforced nylon.

In another embodiment, a width of the bushing is the same as a width of the hexagonal head.

In another embodiment, a width of the rectangular block is the same as a width of the hexagonal head.

In another embodiment, a distance between the two side walls is the same as a width of the hexagonal head.

In another embodiment, a distance between the two side walls is 1-2 mm longer than a width of the hexagonal head.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

Figure 1:
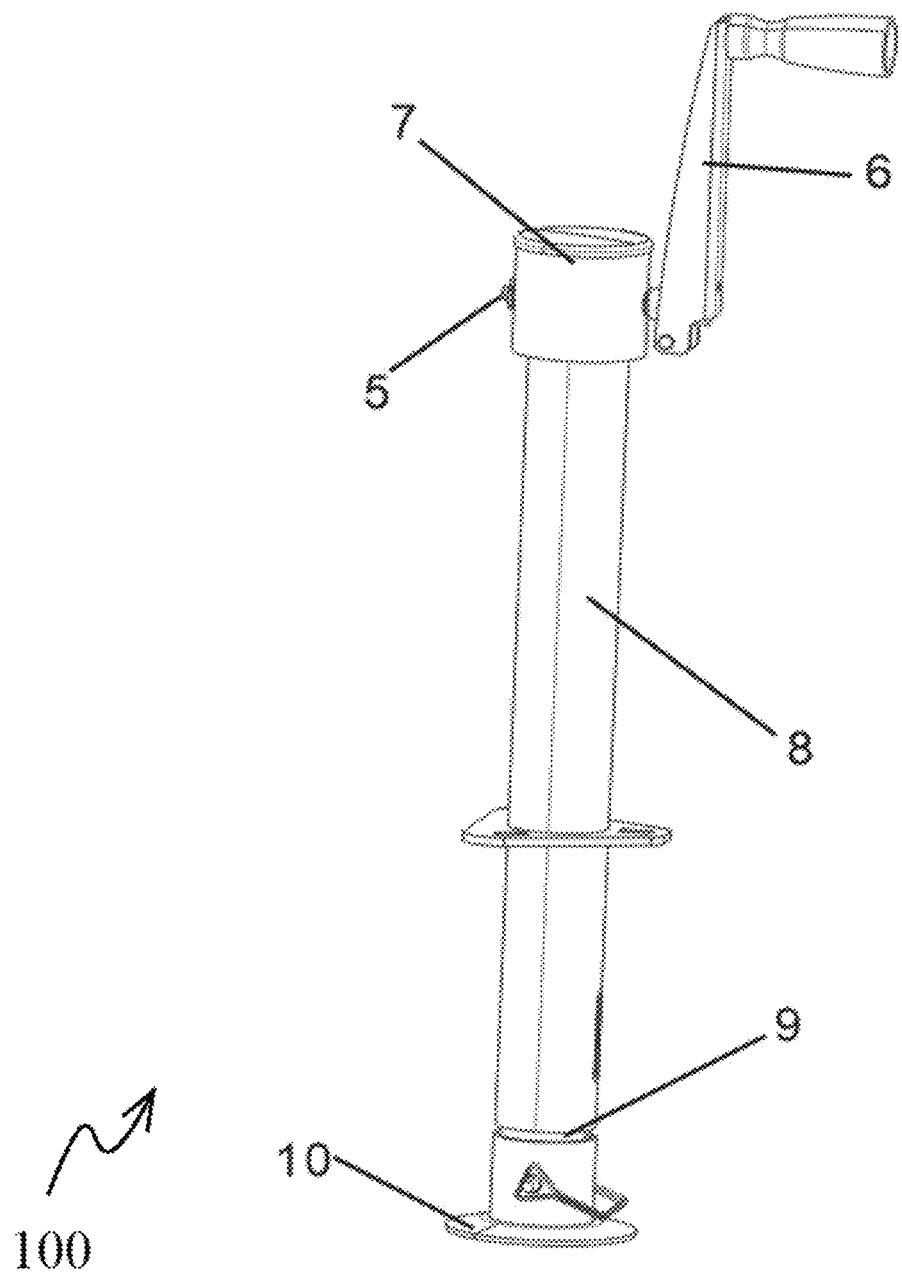
FIG. 1 shows a manual trailer lifting jack with drill power option in a lifted position.

Description of reference numerals: 1. a threaded rod; 2. a threaded block; 3. a driving gear; 4. a bevel gear; 5. a gear shaft; 6. a hand crank; 7. a gear housing; 8. an outer tube; 9. an inner tube; 10. a foot; 11. through holes; 12. a hexagonal head; 13. an adapter; 14. a bushing; 15. a rectangular block; 16. a bolt; 17. a handle; 18. crank; 19. side walls; 20. a connection wall; 21. a stop block; and 100. a manual trailer lifting jack with drill power option.

DETAILED DESCRIPTION OF THE ILLUSTRATED EMBODIMENTS

Reference will now be made in detail to embodiments of the present invention, example of which is illustrated in the accompanying drawings.

In the description of the present application, it is necessary to understand that the terms "center," "top," "bottom," "left," "right," "vertical," "horizontal," "inside," "outside," "bottom," "top" and other indicative orientation or position relations are based on the orientation or position relations shown in the drawings. This is intended only for the convenience of describing and simplifying the description of the present application, and is not intended to indicate or imply that the device or element referred to must have a specific orientation, or be constructed and operated in a specific orientation, and therefore cannot be understood as a limitation on the new form of the utility.

As shown in FIG. 1, a manual trailer lifting jack with drill power option 100 includes an outer tube 8, an inner tube 9, a foot 10, a gear housing 7, a hand crank 6, and a gear shaft 5. The foot 10 is connected to a bottom of the inner tube 9. The inner tube 9 is telescopically slidable within the outer tube 8. The gear housing 7 is located on a top of the outer tube 8. The gear shaft 5 passes through the gear housing 7 and is connected to the hand crank 6. A user can manually rotate the hand crank 6 to lift the trailer lifting jack 100 via the gear shaft 5. The trailer lifting jack 100 in FIG. 1 is in a lifted position.

Figure 2:
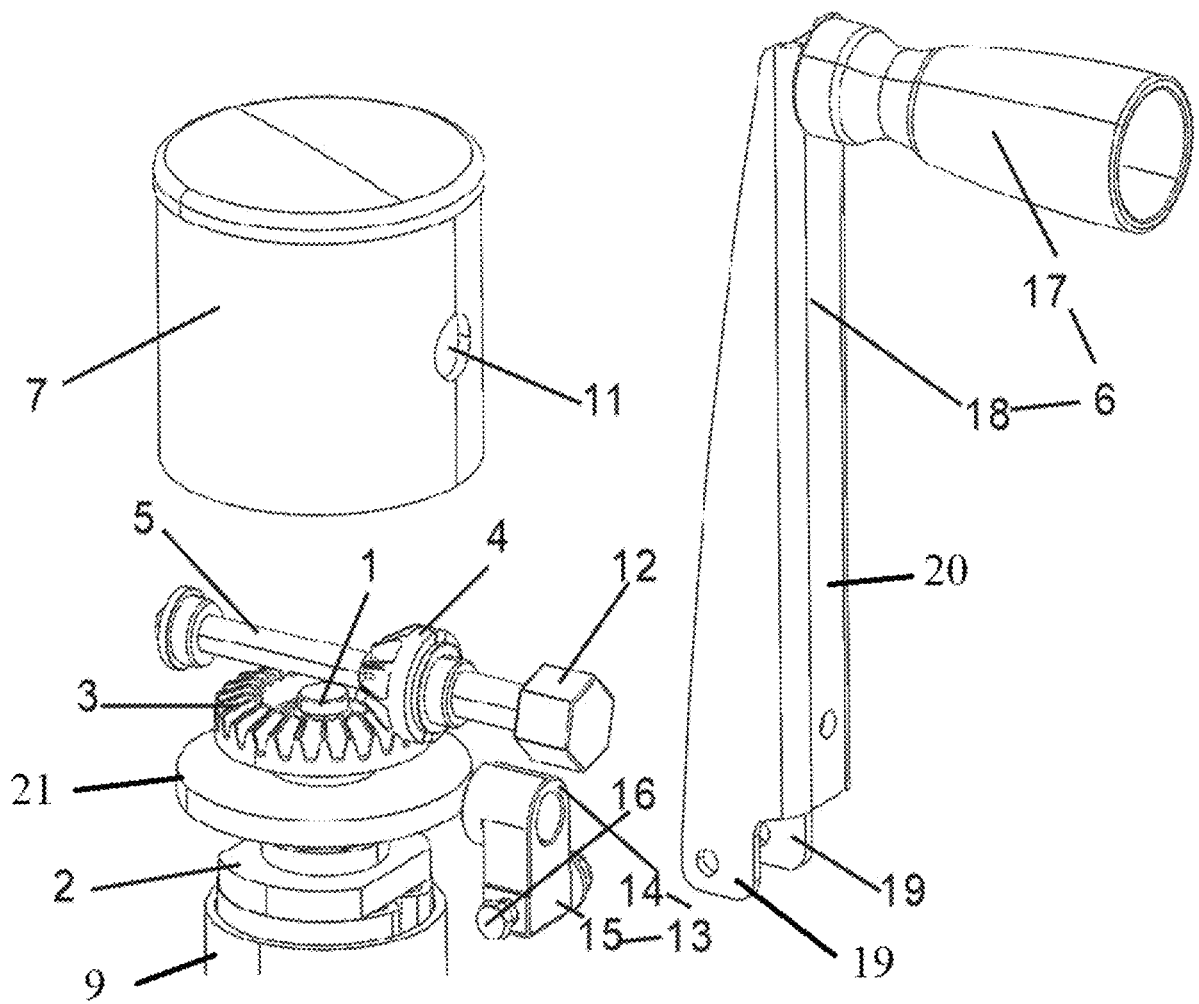
FIG. 2 is a partial view of the manual trailer lifting jack with drill power option in a home position.

FIG. 2 is a partial view of the trailer lifting jack 100 without the gearing housing 7 and the hand crank 6 attached. The trailer lifting jack 100 in FIG. 2 is in a home position. The trailer lifting jack 100 includes a threaded rod 1 and a top block 21. The threaded rod 1 passes through a center of the top block and 21 and is rotatably held within the outer tube 8 and fixed from axial movement relative to the outer tube 8. The trailer lifting jack 100 also includes a threaded block 2 connected to a top of the inner tube 9. The threaded block 2 has threads that engage the threaded rod 1 so that the rotation of the threaded rod 1 causes the inner tube 9 to slide axially within the outer tube 8.

The trailer lifting jack 100 also includes a driving gear 3 that is securely connect the top block 21 and the threaded rod 1. When the driving gear 3 rotates, it simultaneously moves the top block 21 and the threaded rod 1. The threaded rod 1 in turn causes the inner tube 9 to slide axially within the outer tube 8. Thus, the trailer lifting jack 100 can be lifted or lowered to a desired position.

The trailer lifting jack 100 also includes a gear shaft 5. The gear shaft 5 is located on the top of the top block 21 and the driving gear 3. The gear shaft 5 includes a hexagonal head at one end thereof. The gear shaft 5 also includes a bevel gear 4 located at a position that is about one third of a length of the gear shaft 5 from the hexagonal head. The bevel gear 4 engages the driving gear 3 so that the rotation of the bevel gear 4 rotates the driving gear 3. A gear ratio between the bevel gear and the driving gear is 1:1 to 1:5. Preferably, the gear ratio between the bevel gear and the driving gear is 1:2.5.

The gear housing 7 covers the stop block 21, the driving gear 3, and gear shaft 5, and prevent them from being damaged during operation. The gear housing 7 has a cup shape and includes two through hole 11. The gear shaft 5 passes through the through holes and rotates freely.

Figure 3:
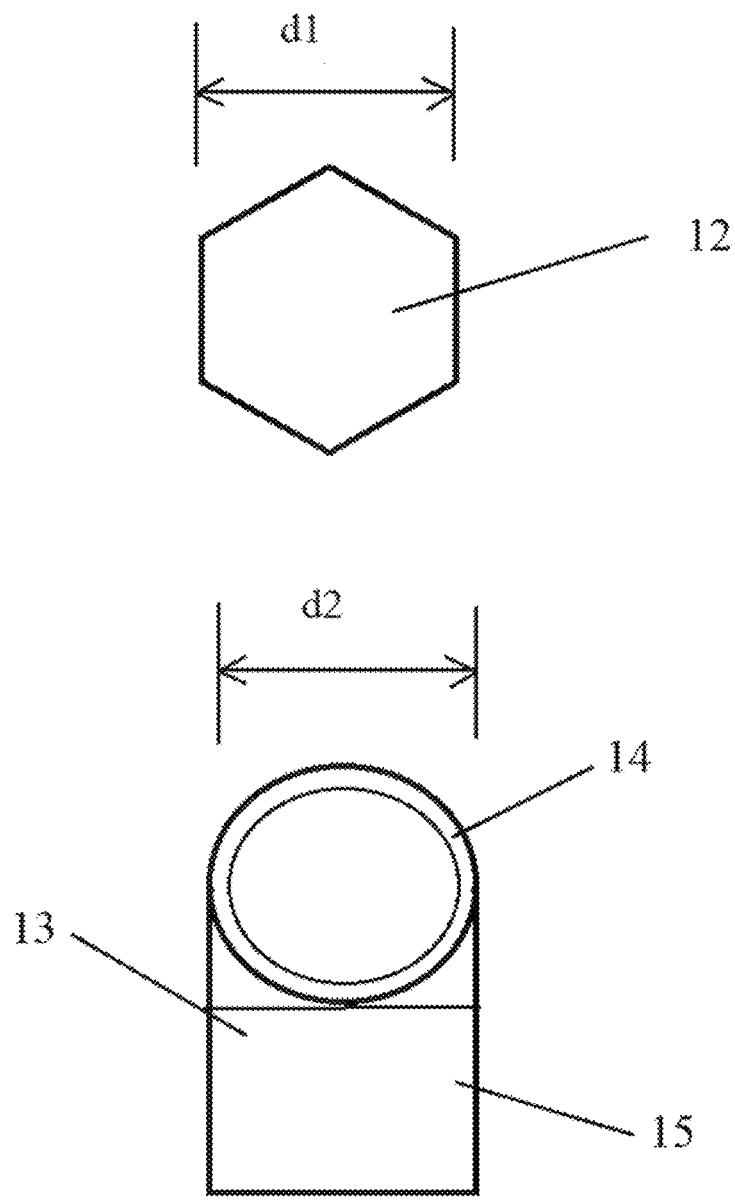
FIG. 3 is a cross sectional view of hexagonal head 12 and adapter 13.

The hexagonal head 12 has a size or width (the distance between two parallel sides of the hexagon) of ¼ to 3 inches. FIG. 3 includes a cross sectional view of hexagonal head 12. The cross sectional view of the hexagonal head 12 is taken from a direction perpendicular to an axis of the gear shaft 5. The size or width of the hexagonal head 12 is shown as d1 in FIG. 3. The hexagonal head can be easily rotated by a hex socket adapter of the same size, and the hex socket adapter can be connected to a power drill, e.g., a pneumatic screwdriver, an electric screwdriver, a pneumatic drill, an electric drill. Therefore, the trailer lifting jack 100 can now be operated by a power drill.

FIG. 2 is a partial view of the manual trailer lifting jack with drill power option in a home position. The trailer lifting jack 100 includes an adapter 13 and a hand crank 6. The adapter 13 includes a bushing 14 and a rectangular block 15. The gear shaft 5 passes through the bushing 14 so that the bushing 14 surrounds the gear shaft 5. The bushing 14 can rotate freely around the gear shaft 5. The bushing 14 is located between the bevel gear 4 and the hexagonal head 12. A cross section of the bushing 14 is a ring shape, and the bushing 14 a width (outer diameter) of d2 as shown in FIG. 3. The cross sectional view of the adapter 13 is taken from a direction perpendicular to an axis of the gear shaft 5. In the cross section that is perpendicular to an axis of the gear shaft 5, the rectangular block 15 has a width d2 that is the same as the width of the bushing 14. The adapter 13 is made of a hard material, preferably, iron or reinforced nylon.

The hand crank 6 includes a crank 18 and a handle 17. The crank 18 is perpendicular to the handle 17. The cross section of the crank 18 from a direction perpendicular to an axis of the crank 18 has a U shape. The crank 18 includes two side walls 19 and a connecting wall 20. The crank 18 is also made of a hard material, preferably, iron or reinforced nylon.

Figure 4:
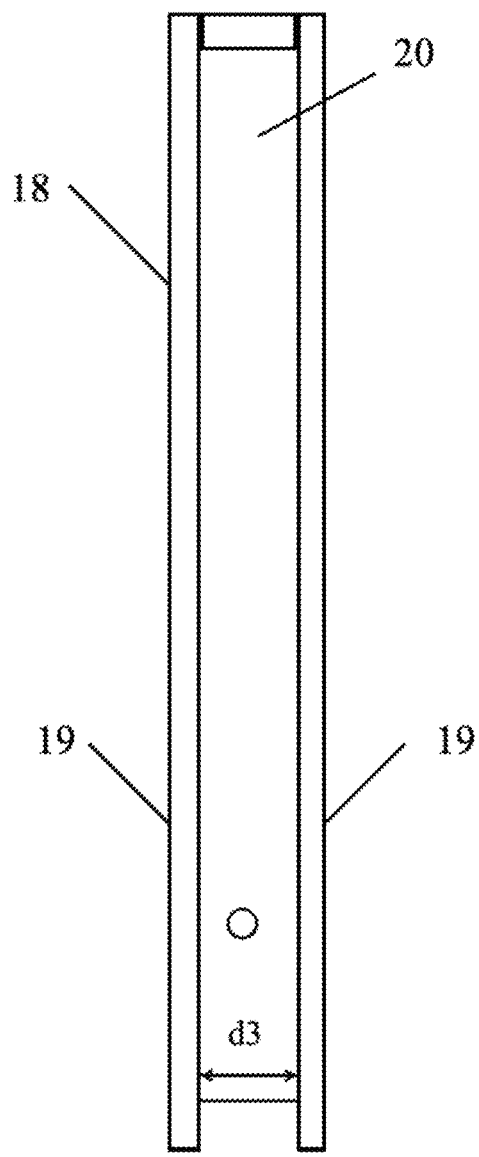
FIG. 4 is a cross sectional view of crank 118.

FIG. 4 is a sectional view of the crank 18 from a direction perpendicular to an axis of the handle 17. As shown in FIG. 4, a distance between the two side walls 19 is d3. The distance d3 is the same as or slightly longer (e.g., 1-5 mm, preferably 1-2 mm) than the width d1 of the hexagonal head.

The trailer lifting jack 100 also includes a bolt 16. The bolt 16 passes through the two side walls 19 and the rectangular block 15 to rotatably connect the hand crank 6 to the adapter 6.

To manually operate the trailer lifting jack 100, a user will rotate the hand crank 6 toward the hexagonal head 12. Because the distance d3 between the two side walls 19 is the same as or slightly longer than the width d1 of the hexagonal head 12, the hexagonal head 12 tightly fits between the two side walls 19. Thus, the side walls 19 engage the hexagonal head 12 so that a rotation of the hand crank 6 causes the rotation of the driving gear 5. The driving gear 5 in turn rotates the threaded rod 1 to lift and lower the trailer lifting jack 100.

To operate the trailer lifting jack 100 with a power drill, a user can rotate the hand crank 6 to expose the hexagonal head 12. The user can rotate the hexagonal head 12 by a hex socket adapter of the same size connected to a power drill. Therefore, the trailer lifting jack 100 can now be operated by a power drill.

The trailer lifting jack 100 has a simple structure, and can be operated both manually and by a power drill.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A manual trailer lifting jack with drill power option comprising:
   an outer tube;
   an inner tube that is telescopically slidable within the outer tube;
   a foot that is connected to a bottom of the outer tube;
   a top block that is connected to a top of the outer tube;
   a threaded rod that pass through a center of the top block and is rotatably held within the outer tube and fixed from axial movement relative to the outer tube;
   a threaded block that is connected to a top of the inner tube and has threads that engage the threaded rod so that a rotation of the threaded rod causes the inner tube to slide axially within the outer tube;
   a driving gear that is connect the top block and drives the threaded rod;
   a gear shaft that includes a bevel gear and a hexagonal head;
   a gear housing that houses the gear shaft, driving gear, and the top block;
   an adapter that includes a bushing and a rectangular block;
   a hand crank that includes a crank and handle; and
   a bolt,
   wherein the hexagonal head is rotated by a power drill to cause the rotation of the threaded rod;
   wherein the bushing surrounds the gear shaft and is located between the bevel gear and the hexagonal head;
   wherein a cross section of the crank has a U shape, and the crank includes two side walls and a connection wall;

wherein the bolt passes through the two side walls and the rectangular block to rotatably connect the hand crank to the adapter; and wherein the side walls engage the hexagonal head so that a rotation of the hand crank causes the rotation of the threaded rod.

2. The manual trailer lifting jack with drill power option of claim 1, wherein a gear ratio between the bevel gear and the driving gear is 1:2.5.

3. The manual trailer lifting jack with drill power option of claim 1, wherein the adaptor is made of iron or reinforced nylon.

4. The manual trailer lifting jack with drill power option of claim 1, wherein the crank is made of iron or reinforced nylon.

5. The manual trailer lifting jack with drill power option of claim 1, wherein a width of the bushing is the same as a width of the hexagonal head.

6. The manual trailer lifting jack with drill power option of claim 1, wherein a width of the rectangular block is the same as a width of the hexagonal head.

7. The manual trailer lifting jack with drill power option of claim 1, wherein a distance between the two side walls is the same as a width of the hexagonal head.

8. The manual trailer lifting jack with drill power option of claim 1, wherein a distance between the two side walls is 1-2 mm longer than a width of the hexagonal head.

\* \* \* \* \*